(12) United States Patent
Gardeski

(10) Patent No.: US 9,538,873 B2
(45) Date of Patent: Jan. 10, 2017

(54) APPARATUS AND METHODS FOR DIPPING OR DUNKING SNACKS INTO BEVERAGES

(71) Applicant: Toby M Gardeski, Cotopaxi, CO (US)

(72) Inventor: Toby M Gardeski, Cotopaxi, CO (US)

( * ) Notice: Subject to any disclaimer, the term of this patent is extended or adjusted under 35 U.S.C. 154(b) by 0 days.

(21) Appl. No.: 14/479,633

(22) Filed: Sep. 8, 2014

(65) Prior Publication Data
US 2015/0157153 A1    Jun. 11, 2015

Related U.S. Application Data

(60) Provisional application No. 61/963,636, filed on Dec. 9, 2013, provisional application No. 61/963,637, filed on Dec. 9, 2013.

(51) Int. Cl.
*A47G 21/10* (2006.01)
*B25J 1/04* (2006.01)
*A47G 19/22* (2006.01)

(52) U.S. Cl.
CPC .............. *A47G 21/10* (2013.01); *A47G 19/22* (2013.01)

(58) Field of Classification Search
CPC ..................................................... A47G 21/10
USPC .......................... 294/25, 117, 118, 16, 28, 26
See application file for complete search history.

(56) References Cited

U.S. PATENT DOCUMENTS

| | | | |
|---|---|---|---|
| 272,320 A * | 2/1883 | Ralston | E04G 21/16 294/118 |
| 790,329 A * | 5/1905 | Taylor | 24/515 |
| 1,236,610 A * | 8/1917 | Sherwood | 294/28 |
| 1,261,065 A * | 4/1918 | Jenkins | 294/87.1 |
| 1,870,133 A * | 8/1932 | Myers | 15/236.06 |
| 2,120,148 A * | 6/1938 | Kallmann | 132/234 |
| 2,846,766 A * | 8/1958 | Harter | A61B 17/3201 206/349 |
| 2,892,655 A * | 6/1959 | Bower | 294/106 |
| 2,921,590 A * | 1/1960 | Holton | 401/8 |
| 3,301,585 A * | 1/1967 | Johnson | B65G 7/12 294/118 |
| 3,399,456 A * | 9/1968 | Johnson et al. | 30/232 |
| D294,672 S * | 3/1988 | Chasen | D7/687 |
| 4,738,556 A * | 4/1988 | Brown | B43K 23/012 15/443 |
| 5,655,806 A * | 8/1997 | Halladay et al. | 294/118 |
| 5,743,450 A * | 4/1998 | Plate | A45F 5/00 224/219 |
| 6,249,277 B1 * | 6/2001 | Varveris | G06F 3/039 294/25 |
| 2005/0012350 A1 * | 1/2005 | Kelsey | A47J 43/283 294/118 |
| 2010/0052347 A1 * | 3/2010 | Teng | 294/99.2 |

* cited by examiner

*Primary Examiner* — Paul T Chin

(74) *Attorney, Agent, or Firm* — Jennifer L. Bales; Macheledt Bales LLP

(57) ABSTRACT

Devices for dipping or dunking snacks into beverages include elements for holding a snack in place for dipping or dunking and a structure for allowing the user to keep his hands out of the beverage while immersing the snack. One embodiment includes scissoring legs and fingertip pads for attachment to a user's finger and thumb so the user can scissor the legs in place to hold the snack for dipping or dunking.

6 Claims, 7 Drawing Sheets

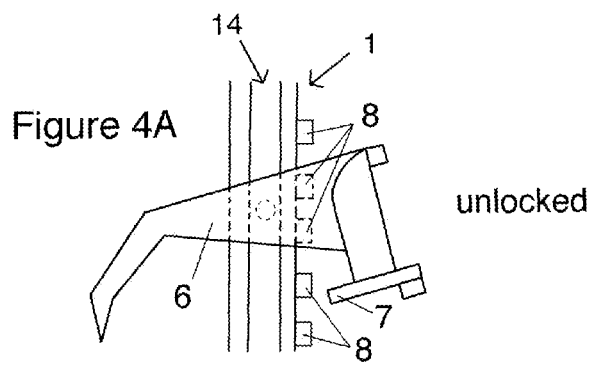
Figure 4A — unlocked
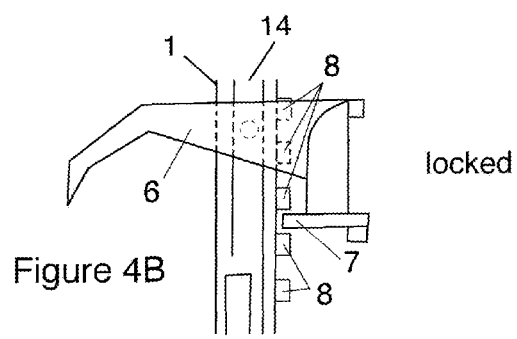
Figure 4B — locked
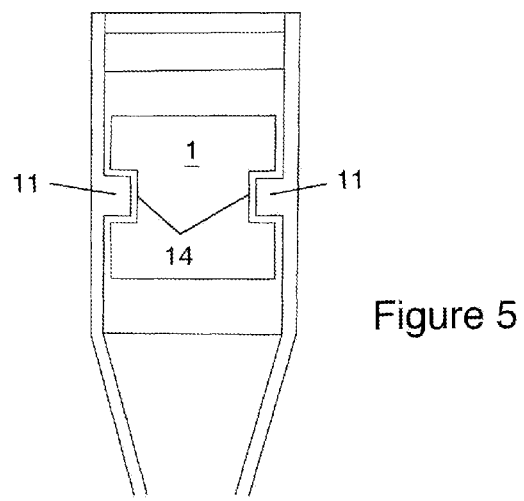
Figure 5

APPARATUS AND METHODS FOR DIPPING OR DUNKING SNACKS INTO BEVERAGES

BACKGROUND OF THE INVENTION

Field of the Invention

The present invention relates to apparatus and methods for dipping or dunking snacks into beverages.

Discussion of Related Art

Kids want to dip cookies into milk and adults want to dip pastries into coffee. In either case, the dipper either gets his fingers wet or part of the snack doesn't get wet. In addition, the snack tends to fall apart once it gets wet. A need remains in the art for improved devices to allow dipping and dunking of snacks into liquid.

SUMMARY OF THE INVENTION

Devices according to the present invention for immersing snacks into beverages include elements for holding a snack in place for dipping or dunking and a structure for allowing the user to keep his hands out of the beverage while immersing the snack. One embodiment, called the Dip or Dunk, includes a handle, a tray and a pivoting holding arm which slides up and down the handle and pivots into place to hold the snack. Another embodiment, called the Dipper, includes scissoring legs and fingertip pads for attachment to a user's finger and thumb so the user can scissor the legs in place to hold the snack for dipping or dunking.

Dip or Dunk apparatus for immersing a snack in a beverage comprises a tray for holding the snack, a handle attached to the tray, a holding arm attached to the handle, and a slide mechanism for allowing the holding arm to slide along the handle such that the holding arm may be positioned to hold the snack against the tray. A pivot mechanism allows the holding arm to rotate toward and away from the tray in order to hold the snack in place. The pivot mechanism further allows the holding arm to be locked into place with respect to the handle in a first position and to be unlocked with respect to the handle in a second pivot position. The holding arm includes a locking pin and the handle includes teeth, and the pivoting mechanism allows the locking pin to rotate between handle teeth to lock the holding arm in place.

The holding arm further comprises a spike for optionally impaling the snack, if the snack is large. If the snack is smaller, it may fit into an indented center portion of the holding arm. Wings attached to the handle adjacent to the tray prevent the snack from excessive wobbling. A plate is included so the tray may be placed on the plate to allow the snack to drain after immersion.

In another embodiment, Dipper apparatus for immersing a snack in a beverage comprises two legs connected in a scissoring arrangement. A foot is attached to a first end of each leg for gripping a snack. A finger attachment element is attached to a second end of each leg. The finger attachment elements attach a finger or a thumb to each leg. Thus, when the finger and thumb are moved it causes the finger attachments to move also. When the finger attachments are moved together the feet move together to grip a snack and when the finger attachment elements are moved apart, the feet move apart. The feet are formed of a resilient material for gripping.

Each finger attachment element comprises a T-bar frame and an attachment strap for threading through the frame and around a finger to attach the finger to the frame. The attachment strap includes hook and loop fastening sections. The finger attachment element further includes a fingertip pad attached to the T-bar frame. The fingertip pad forms a bumpy surface for gripping. The apparatus floats in a liquid. Again, a plate is included for draining the snack after immersion.

BRIEF DESCRIPTION OF THE DRAWINGS

FIG. 4A shows a detailed view of a pivoting holding arm of the Dip or Dunk of FIG. 1 in an unlocked position. FIG. 4B shows a detailed view of a pivoting holding arm of the Dip or Dunk of FIG. 1 in a locked position.

FIG. 5 shows a detailed cutaway top view of a portion of a handle and a pivoting holding arm the Dip or Dunk of FIG. 1.

DETAILED DESCRIPTION OF THE INVENTION

The below table shows elements and their associated reference numbers for convenience.

| Ref. No. | Element |
| --- | --- |
| 1 | Dip or Dunk handle |
| 2 | Dip or Dunk tray |
| 3 | Dip or Dunk tray spikes |
| 4 | Pivoting holding arm spike |
| 5 | Pivoting holding arm center |
| 6 | Pivoting holding arm |
| 6A | Side of pivoting holding arm |
| 7 | Locking pin |
| 8 | Teeth |

-continued

| Ref. No. | Element | | | | |
|---|---|---|---|---|---|
| 9 | Arm locking lever point | | | | |
| 10 | Arm unlocking lever point | | | | |
| 11 | Holding arm axis rods | | | | |
| 12 | Tray wings | | | | |
| 13 | Tray front lip | | | | |
| 14 | Handle track | | | | |
| 15 | Dip or Dunk device | | | | |
| 16 | Glass | | | | |
| 17 | Snack | | | | |
| 18 | Liquid | | | | |
| 20 | Plate | | | | |
| 21 | Logo | | | | |
| 29 | Fingertip pad | | | | |
| 30 | Dipper device | 30A | Little Dipper | 30B | Big Dipper |
| 31 | T-bar frame | | | | |
| 32 | Attachment strap | | | | |
| 33 | Dipper legs | | | | |
| 34 | Dipper feet | | | | |
| 35 | Finger | | | | |
| 36 | Thumb | | | | |
| 38 | Cup | | | | |
| 39 | Hook portion of attachment strap | | | | |
| 40 | Loop portion of attachment strap | | | | |

Figure 1:
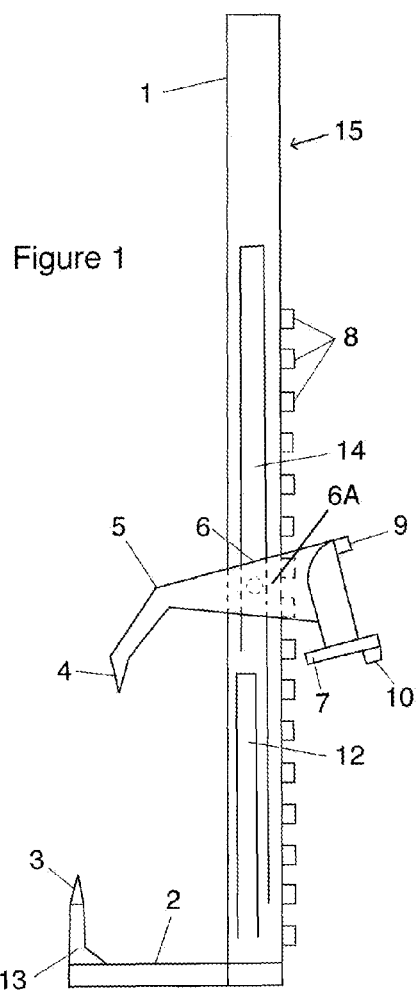
FIG. 1 is a side view of a Dip or Dunk according to the present invention

FIG. 1 is a side view of one embodiment of a Dip or Dunk 15 according to the present invention. Dip or Dunk 15 comprises a dunk handle 1, a dunk tray 2, and a pivoting holding arm 6. Pivoting holding arm 6 may be moved up and down within dunk handle track 14 in order to place it to hold a snack 17. Once pivoting holding arm 6 is in place, it is locked by pivoting locking pin 7 to lock between the appropriate teeth 8, for example by pressing arm locking lever point 9 down. It is unlocked for example by pulling arm unlocking lever point 10 upward.

Pivoting holding arm 6 includes a spike 4 which may be used to impale a large snack such as a bagel or may pivot to the outside of snack 17 to hold it in place from the side. Similarly, dunk tray 2 includes spikes 3 and lip 13. Spikes 3 may impale snack 17 or hold it in place from the side. Tray 2 also includes wings 12, better shown in FIG. 2.

Figure 2:
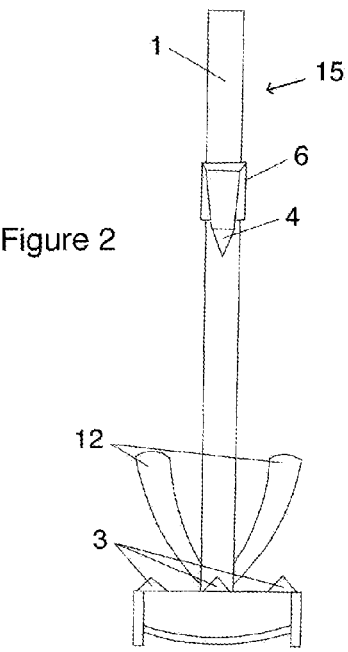
FIG. 2 is a front view of the Dip or Dunk of FIG. 1.

FIG. 2 is a front view of Dip or Dunk 15 of FIG. 1. From the front, it can be seen that wings 12 help to stabilize a wide snack 17 by preventing it from rotating with respect to dunk handle 1. Tray 2 includes 3 dunk tray spikes in this embodiment.

Figure 3:
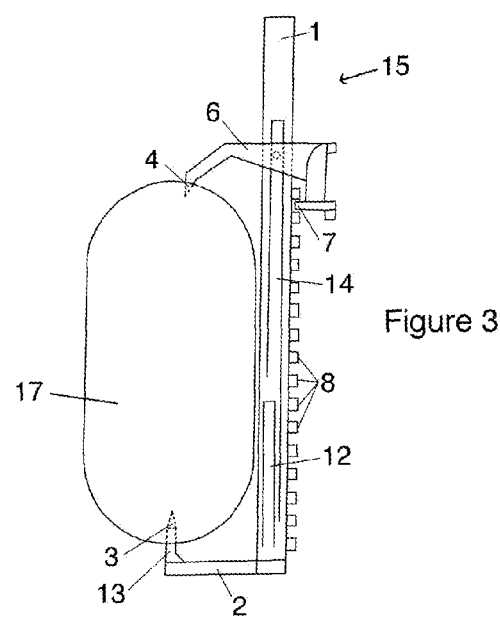
FIG. 3 is a detailed view of a portion of the Dip or Dunk of FIG. 1 holding a snack in place.

FIG. 3 is a detailed view of a portion of Dip or Dunk 15 holding a snack 17 in place. In this example, snack 17 is large and thick, for example a bagel or doughnut. Thus spikes 3, 4 impale snack 17 in order to hold it in place.

FIG. 4A shows a detailed view of pivoting holding arm 6 in an unlocked position. FIG. 4B shows a detailed view of pivoting holding arm 6 in a locked position. When in an unlocked position, pivoting holding arm 6 may be moved up and down within track 14 of dunk handle 1. When in a locked position, teeth 8 prevent locking pin 7 from moving up or down.

FIG. 5 shows a detailed cutaway top view of a portion of dunk handle 1 and pivoting holding arm 6. Holding arm axis rods 11 allow pivoting holding arm 6 to move up and down within handle track 14, and also allow pivoting holding arm 6 to pivot between the locked and unlocked positions.

Figure 6:
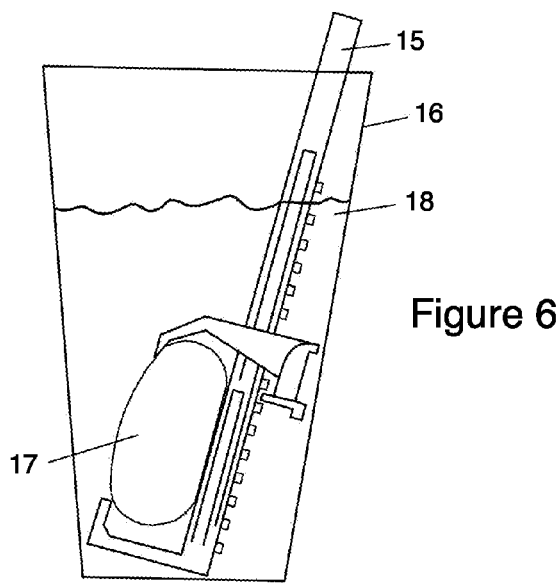
FIG. 6 shows a side view of the Dip or Dunk of FIG. 1 in use, dunking a snack into liquid.

FIG. 6 shows a side view of Dip or Dunk 15 in use, dunking snack 17 into liquid 18 in glass 16. In this example, snack 17 is thin enough to be held in from the side by spike 4 of pivoting holding arm 6 and by tray front lip 13 (refer back to FIG. 1 for a better view). This embodiment does not include dunk tray spikes 3

Figure 7:
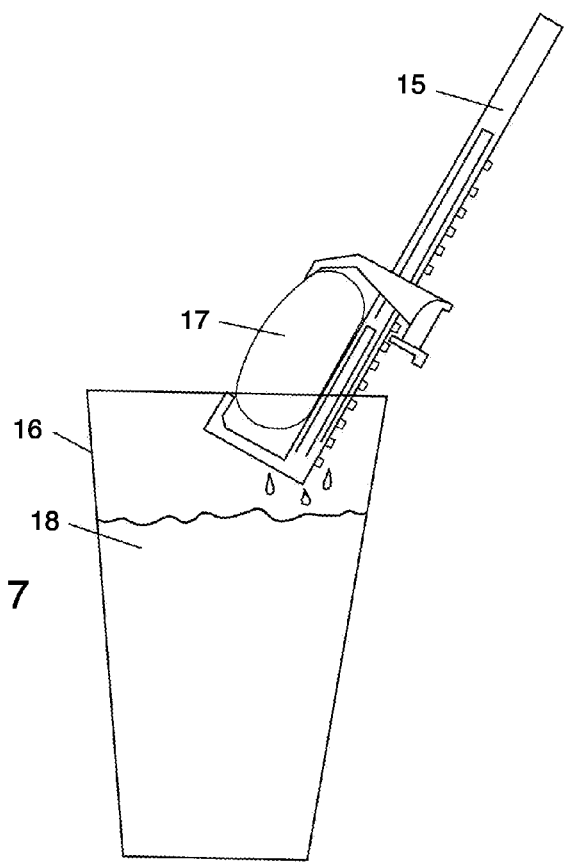
FIG. 7 shows a side view of the Dip or Dunk of FIG. 1 in use, draining excess liquid from the snack after dunking.

FIG. 7 shows a side view of Dip or Dunk 15 in use, draining excess liquid 18 from snack 17 after dunking.

Figure 8:
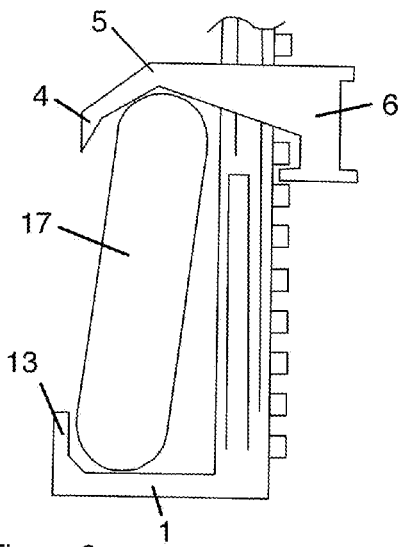
FIG. 8 is a detailed side view of a portion of the Dip or Dunk of FIG. 1 holding a snack in place.
Figure 9:
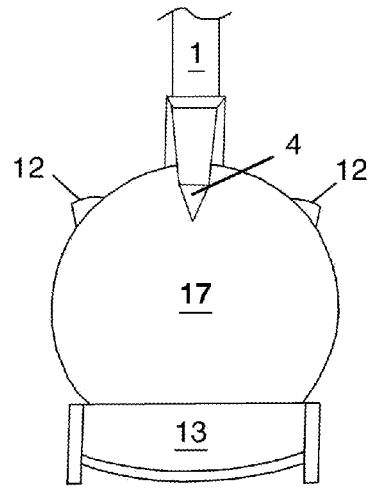
FIG. 9 is a detailed front view of a portion of the Dip or Dunk of FIG. 1 holding a snack in place.

FIG. 8 is a detailed side view of a portion of the Dip or Dunk 15 holding a thin snack 17 (such as a cookie) in place. In this example, snack 17 slides forward within dunk tray 1 until it is retained by lip 13. The top of snack 17 slides into and is held in place by center 5 of pivoting holding arm 6. FIG. 9 is a detailed front view of the same portion of Dip or Dunk 15. Wings 12 prevent snack 17 from wobbling.

Figure 10:
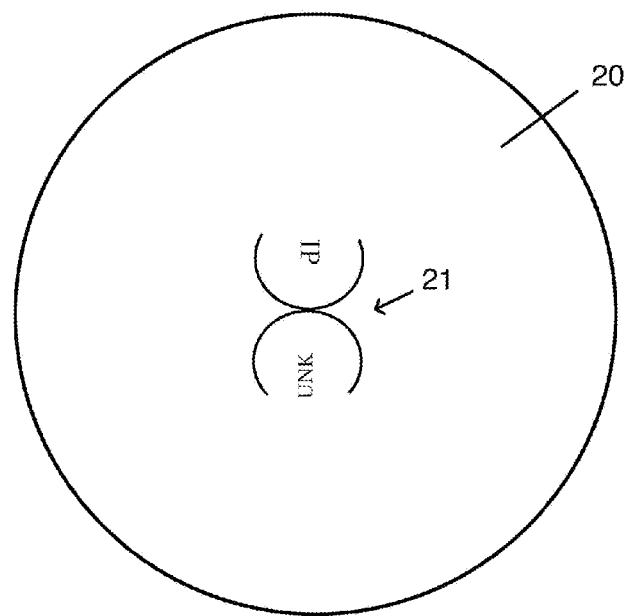
FIG. 10 is a top view of a plate for a dipped or dunked snack.

FIG. 10 is a top view of a plate 20 for a dipped or dunked snack. It is shown with the Dip or Dunk logo 21. Plate 20 is a normal round plate used to stand Dip or Dunk 15 on after each use, to catch any of the beverage 18 that did not drain into the cup or glass while snack 17 was retrieved.

An example of Dip or Dunk user instructions follows.

This apparatus was designed to make it easier to dip or dunk a snack (such as a cookie, doughnut, or Danish) into a beverage such as coffee or milk. It comes complete with a holding tray and holding arm attached to a handle designed to hold your snack in place while dipping or dunking it. There are holding spikes on the upper lip of the holding tray. They were put there to hold a doughnut or Danish that is too big for the tray in place. With help from the holding arm, you should have no trouble dipping or dunking a larger snack. This apparatus will stand straight up on the plate that was included for easier loading and unloading. It was designed so that most of the beverage you are dipping it into will drain off the bottom of the handle while retrieving your snack. So let's get started by reading the instructions and enjoying yourself.

If you have looked over the parts list you are ready to use your Dip or Dunk original. Let's get started by standing your dip or dunk on the plate that was included. Check to see if the locking pin is in the unlocked positions as illustrated on the parts list. If the locking pin is not in the unlocked position, put your index finger under the unlocking lever point and pull it up and away from the handle teeth as illustrated on the parts list. Now that the locking pin is unlocked, put your thumb on one side of the holding arm and your index finger on the other side. By turning the holding arm counter-clockwise, keeping the locking pin from hitting the handle teeth, you can easily slide the holding arm up and down the handle.

—Loading Your Dip or Dunk—

Now that you know how to control the holding arm, slide it to the top of the handle and hold it there. Using your other hand, stand your snack firmly into the holding tray. Once the snack is in place, slide the holding arm down the handle and lay it on top of the snack. The top of the snack must be under the center or spike of the holding arm for the locking pin to work properly. After making sure your snack is in the correct position, slide the holding arm down the handle one more time to make sure it is good and tight and let go. If the locking pin did not lock on its own, put your thumb on top of the arm locking lever point and slowly press down until the locking pin locks into place between two of the handle teeth. Congratulations! That is how to load your Dip or Dunk original. Now go ahead and dip or dunk.

—Unloading Your Dip or Dunk—

After dipping or dunking your snack for your desired time, pull your Dip or Dunk out of your beverage and hold it on the inside rim of the cup or glass over the beverage, giving it time to drain. After your desired draining time, stand your Dip or Dunk back on the plate and, while holding the handle with one hand, use your other hand to unlock the locking pin from the handle teeth and retrieve your snack. ☺

If you have any trouble getting the locking pin to unlock, from the handle teeth, put your index finger on the center of the holding arm and press down while at the same time pulling the locking pin away from the handle teeth until it is unlocked. This technique will be sure to work.

Thank you for buying a Dip or Dunk Original.

Figure 11:
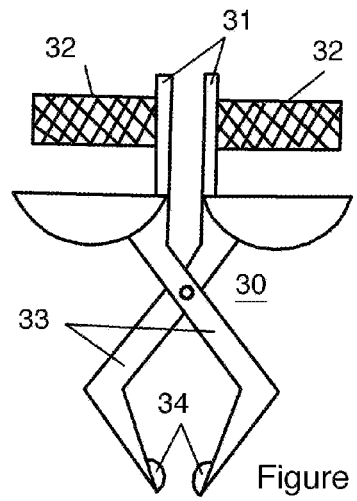
FIG. 11 is a front view of a Dipper according to the present invention.
Figure 14:
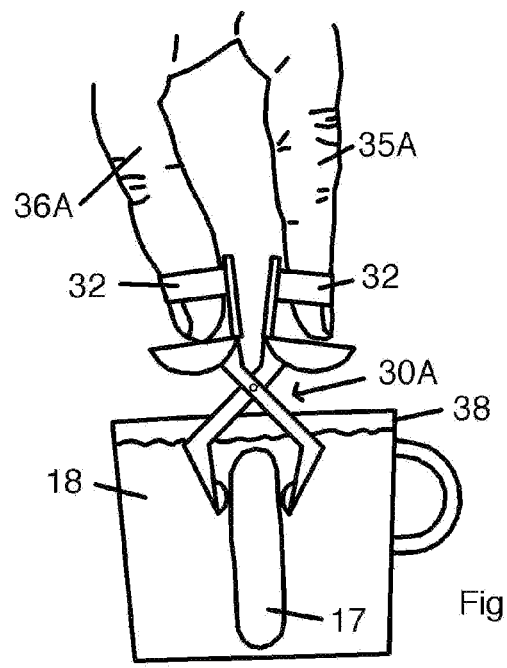
FIG. 14 is a side view of a Big Dipper in use dipping a snack into a coffee cup.
Figure 15:
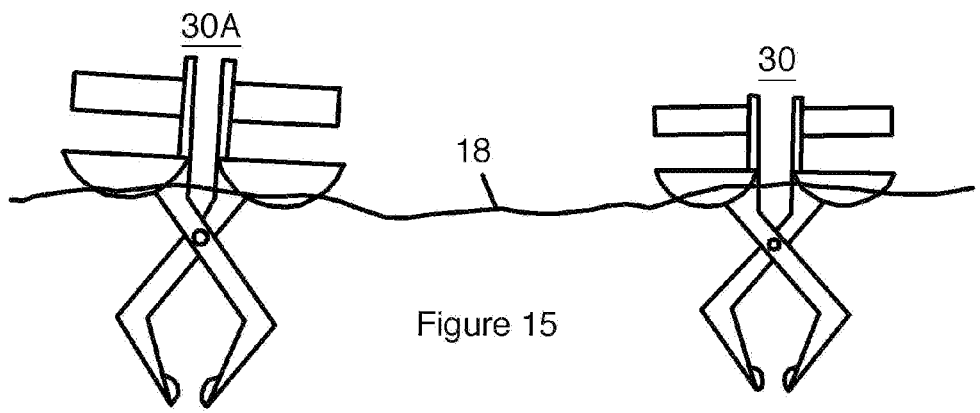
FIG. 15 is a front view of a Big Dipper and Little Dipper floating in a liquid.

FIG. 11 is a front view of one embodiment of a Dipper 30 according to the present invention. Dipper 30 comes in different sizes for use by different users. Little Dipper 30A and Big Dipper 30B are shown in FIGS. 13-15. Dipper 30 comprises two T-bar frames 31, attachment straps 32, scissoring legs 33, and resilient feet 34. A user affixes a finger to one T-bar frame 31 with an attachment strap 32 and a thumb to the other T-bar frame 31 with a second attachment strap 32 and opens and closes Dipper 30 to grip a snack 17. Resilient feet 34 (for example rubber) help hold snack 17 in place.

Figure 12A:
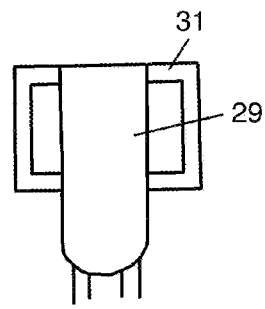
FIG. 12A is a detailed side view of a T-bar frame of the Dipper of FIG. 1.

FIG. 12A is a detailed side view of a T-bar frame 31 of Dipper 15 of FIG. 11. T-bar frame 31 may include a fingertip pad 29. In this embodiment, T-bar frame 31 forms an open shape to allow attachment strap 32 to thread under and inside the frame, over finger 35 and back through and under the frame. In some embodiments, fingertip pad 29 is rough or bumpy for a better grip.

Figure 12B:
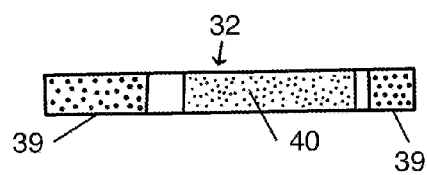
FIG. 12B is a detailed side view of an attachment strap of the Dipper of FIG. 1.

FIG. 12B is a detailed side view of attachment strap 32. In this example, attachment strip 32 includes a hook and loop closure. Hook portion 39 is placed on two ends of attachment strap 32. Loop portion 40 is placed in the middle of attachment strap 32.

Figure 12C:
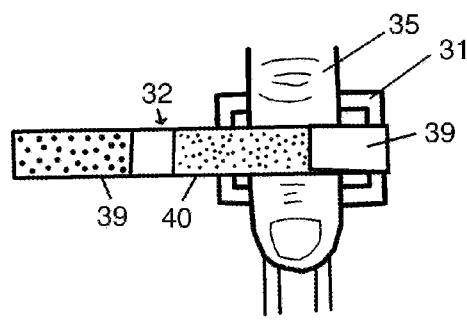
FIG. 12C is a detailed side view of a T-bar frame of the Dipper of FIG. 1, as a user begins to attach the T-bar frame to the user's finger.

FIG. 12C is a detailed side view of T-bar frame 31 of Dipper 30, as a user begins to attach the T-bar frame 31 to the user's finger 35. Finger 35 is placed on findertip pad 29. Attachment strap 32 was threaded under one side of the frame forming T-bar frame 31 and one end hook portion 39 was attached to center loop portion 40. Next, the user places a finger on fingertip pad 29 and brings the rest of strap 32 over the finger.

Figure 12D:
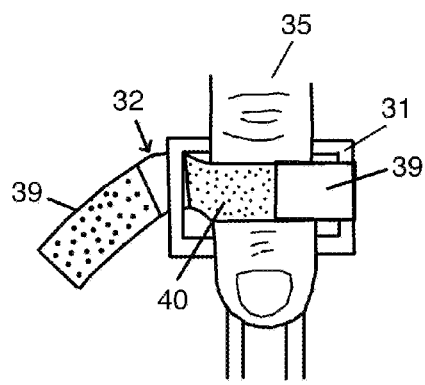
FIG. 12D is a detailed side view of a T-bar frame of the Dipper of FIG. 1, as the user continues the process of attaching the T-bar frame to the user's finger.

FIG. 12D is a detailed side view of T-bar frame 31, as the user continues the process of attaching T-bar frame 31 to the user's finger 35. Now, attachment strap 32 is threaded under the other side of the frame forming T-bar frame 31. The second hook portion 39 will then attach center loop portion 40.

Figure 12E:
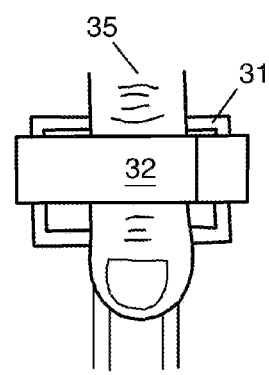
FIG. 12E is a detailed side view of a T-bar frame of the Dipper of FIG. 1, after the user has attached the T-bar frame to the user's finger.

FIG. 12E is a detailed side view of T-bar frame 31, after the user has attached T-bar frame 31 to the user's finger 35. Strap 32 was pulled snug and second hook portion 39 was attached to the center loop portion 40. The same process is used to attach the user's thumb 36 to the other T-bar frame 31 (See FIGS. 13-14).

Figure 13A:
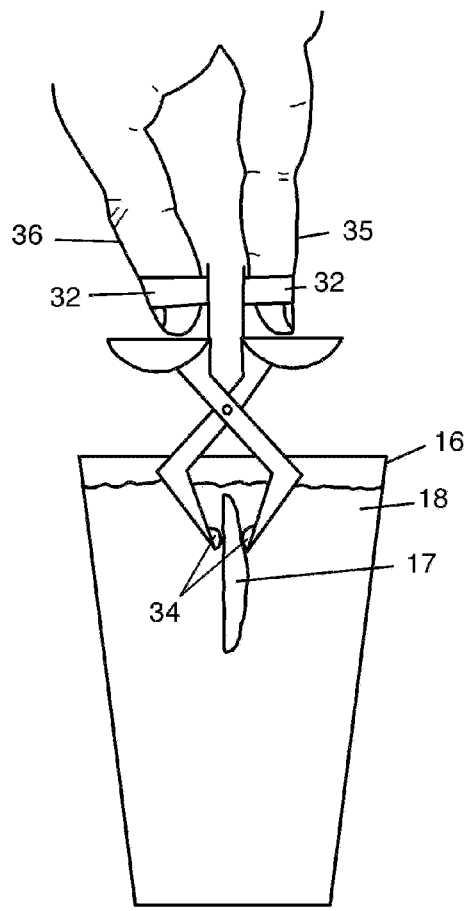
FIG. 13A is a front view of a Little Dipper according to the present invention in use, with a full glass.
Figure 13B:
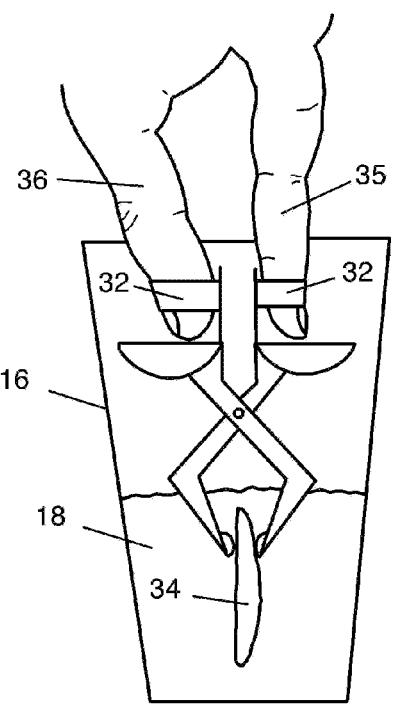
FIG. 13B is a front view of the Little Dipper in use, with a half-full glass.

FIG. 13A is a front view of a Little Dipper 30A according to the present invention in use, with a full glass 16. The user might be a child with small fingers 35. FIG. 13B is a front view of the Little Dipper in use, with a half-full glass. The user's small fingers allow him to reach into the glass with Little Dipper 30A and dip his snack 17, even when beverage 18 is half gone. Note that Plate 10 may also be provided with Dipper 30.

FIG. 14 is a side view of a Big Dipper 30B in use dipping a snack into a coffee cup 38. Big Dipper 30B is better sized for adult fingers.

FIG. 15 is a front view of a Big Dipper 30B and Little Dipper 30A floating in a liquid 18. In this embodiment, Dippers 30 are formed of a material (for example plastic) that floats. This is convenient if a user drops a Dipper 30 into a liquid and needs to retrieve it.

An example of Dip or Dunk user instructions follows.

By using Velcro™, you can attach this apparatus to your index finger and thumb of your left or right hand by following the instructions included. It was designed to add an extension to your index finger and thumb to make it easier for you to dip or dunk your snack, such as a cookie, doughnut, or Danish, into beverages such as coffee or milk. Once attached properly this apparatus will open and close along with the finger and thumb it is attached to. The bottom of this apparatus has a rubber tip on each end for better gripping on the snack. So let's get started by reading the instructions and having fun.

Your Dipper original comes with two separate Velcro™ straps. Please attach one strap to each fingertip pad before using. The Velcro™ side of each strap should face away from the T-bar and T-bar frame after attachment. Each fingertip pad has a bumpy surface for a better grip.

Step 1: Place your index finger tip firmly against the T-bar frame.

Step 2: By using your other hand grab the loose end of the Velcro™ strap and lay the strap over the top of your finger while pushing the end of the strap down the side of your finger and through the T-bar.

Step 3: Grab the end of the strap and while pulling it tight wrap it back around to the top of your finger and press the Velcro™ together pressing it together keeping it in place. If necessary, ask an adult to trim off any unneeded Velcro™ strap by using scissors to fit better.

Now place your thumb on the other fingertip pad and repeat steps 1-3.

While the exemplary preferred embodiments of the present invention are described herein with particularity, those skilled in the art will appreciate various changes, additions, and applications other than those specifically mentioned, which are within the spirit of this invention. For example, attachment straps 32 could use some other form of adhesive, or could be affixed to T-bar frame 31, which could be a solid surface rather than a frame.

Note that terms such as "top", "bottom", "front" and "side" are used for convenience when describing the embodiments in the figures, but are not intended to be limiting to any particular orientation. Further, the term "finger" includes a thumb as well.

What is claimed is:

1. Apparatus for immersing a snack in a beverage comprising:
   two legs connected in a scissoring arrangement;
   a foot attached to a first end of each leg, the feet for gripping a snack;
   an open T-bar frame attached to the second end of each leg;
   straps; and
   a concave floating element attached to each leg wherein the apparatus floats in a liquid;
   wherein the T-bar frames and the straps are configured to attach a finger or a thumb to each T-bar frame by threading a strap through one of the T-bar frames and around a finger or thumb;
   such that when the T-bar frames are moved together the feet move together to grip a snack and when the T-bar frames are moved apart, the feet move apart.

2. The apparatus of claim 1 wherein the feet are formed of a resilient material for gripping.

3. The apparatus of claim 1 wherein the attachment strap includes hook and loop fastening sections.

4. The apparatus of claim 1 further including a fingertip pad attached to the T-bar frame.

5. The apparatus of claim 4 wherein the fingertip pad forms a bumpy surface for gripping.

6. The apparatus of claim 1, further including a separate plate upon which the legs may be rested for draining the snack after immersion.

\* \* \* \* \*